(12) United States Patent
Duparre et al.

(10) Patent No.: US 7,920,339 B2
(45) Date of Patent: Apr. 5, 2011

(54) METHOD AND APPARATUS PROVIDING SINGLET WAFER LENS SYSTEM WITH FIELD FLATTENER

(75) Inventors: Jacques Duparre, Jena (DE); Steven D. Oliver, San Jose, CA (US)

(73) Assignee: Aptina Imaging Corporation, George Town (KY)

( * ) Notice: Subject to any disclaimer, the term of this patent is extended or adjusted under 35 U.S.C. 154(b) by 131 days.

(21) Appl. No.: 12/167,161

(22) Filed: Jul. 2, 2008

(65) Prior Publication Data

US 2010/0002313 A1    Jan. 7, 2010

(51) Int. Cl.
G02B 3/08 (2006.01)
G02B 9/14 (2006.01)
G02B 13/18 (2006.01)
G11B 7/00 (2006.01)

(52) U.S. Cl. ........ 359/742; 359/743; 359/786; 359/796; 359/797; 359/718; 359/719; 369/44.32; 369/112.01; 369/112.03

(58) Field of Classification Search .......... 359/742, 359/743, 786, 796, 797, 718, 719; 369/44.32, 369/112.01, 112.03
See application file for complete search history.

(56) References Cited

U.S. PATENT DOCUMENTS

| | | | |
|---|---|---|---|
| 6,914,730 B2 * | 7/2005 | Nakano et al. | ............. 359/719 |
| 6,962,447 B2 | 11/2005 | Ogata | |
| 7,253,957 B2 | 8/2007 | Akram et al. | |
| 7,286,295 B1 | 10/2007 | Sweatt et al. | |
| 2003/0053032 A1 | 3/2003 | Nakano et al. | |
| 2003/0066955 A1 | 4/2003 | Schaub et al. | |
| 2004/0246595 A1 | 12/2004 | Beach | |
| 2005/0052751 A1 | 3/2005 | Liu et al. | |
| 2006/0087572 A1 | 4/2006 | Schroeder | |
| 2007/0002467 A1 | 1/2007 | Claytor | |
| 2007/0069109 A1 | 3/2007 | Lee | |
| 2007/0126898 A1 | 6/2007 | Feldman et al. | |
| 2007/0201148 A1 | 8/2007 | Eckhardt | |
| 2007/0279520 A1 | 12/2007 | Lee et al. | |

FOREIGN PATENT DOCUMENTS

| | | |
|---|---|---|
| JP | 2005-10409 | 1/2005 |
| JP | 2005-10521 | 1/2005 |
| TW | 584738 | 4/2004 |
| TW | 288857 | 10/2007 |
| WO | WO-2007/008766 | 1/2007 |
| WO | WO-2007/120370 | 10/2007 |

OTHER PUBLICATIONS

Jacques Duparre et al. "Novel Optics/Micro-Optics for Miniature Imaging Systems", Proceeding of SPIE, 2006.
Jacques Duparre et al. "Artificial Compound Eyes - Different Concepts and Their Application to Ultra Flat Image Acquisition Sensors",Proceedings of SPIE, 2004.
R. Volkel et al. "Miniaturization of Imaging Systems", MST/MEMS for Production Engineering, mstnews, Feb. 2003.
J. Vaillant et al. "Versatile Method for Optical Performances Characterization of Off-Axis CMOS Pixels With Microlens Radial Shift", Proceedings of SPIE, vol. 6817, Mar. 3, 2008.

* cited by examiner

*Primary Examiner* — Evelyn A. Lester

(57) ABSTRACT

Methods and apparatus to correct a curved Petzval focusing surface to a plane using a convex lens, a concave lens, and a space arranged between the curved side of the convex lens and the curved side of the concave lens. The method and apparatus may also include a Fresnel lens arranged between the concave lens and a pixel array.

12 Claims, 21 Drawing Sheets

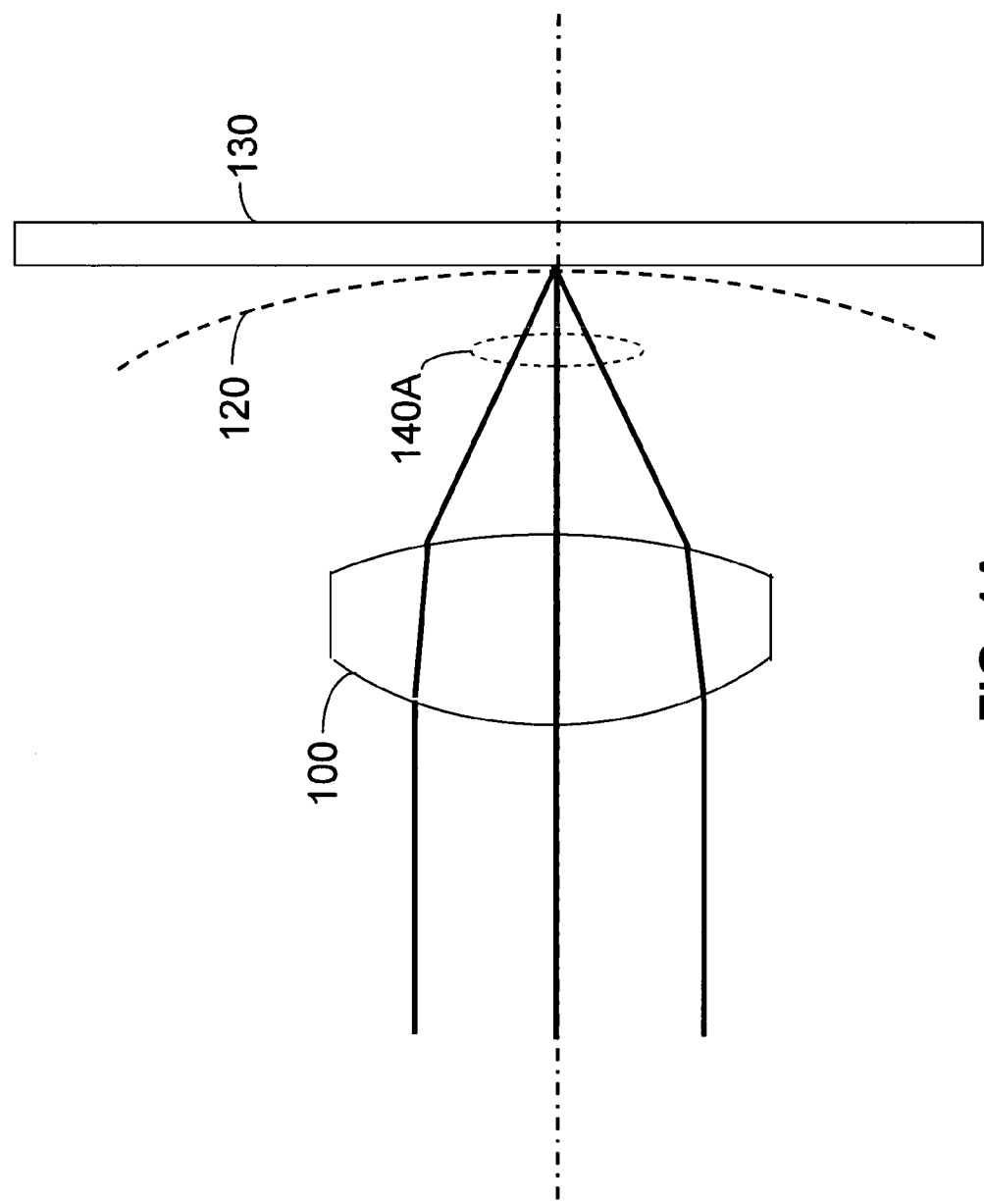

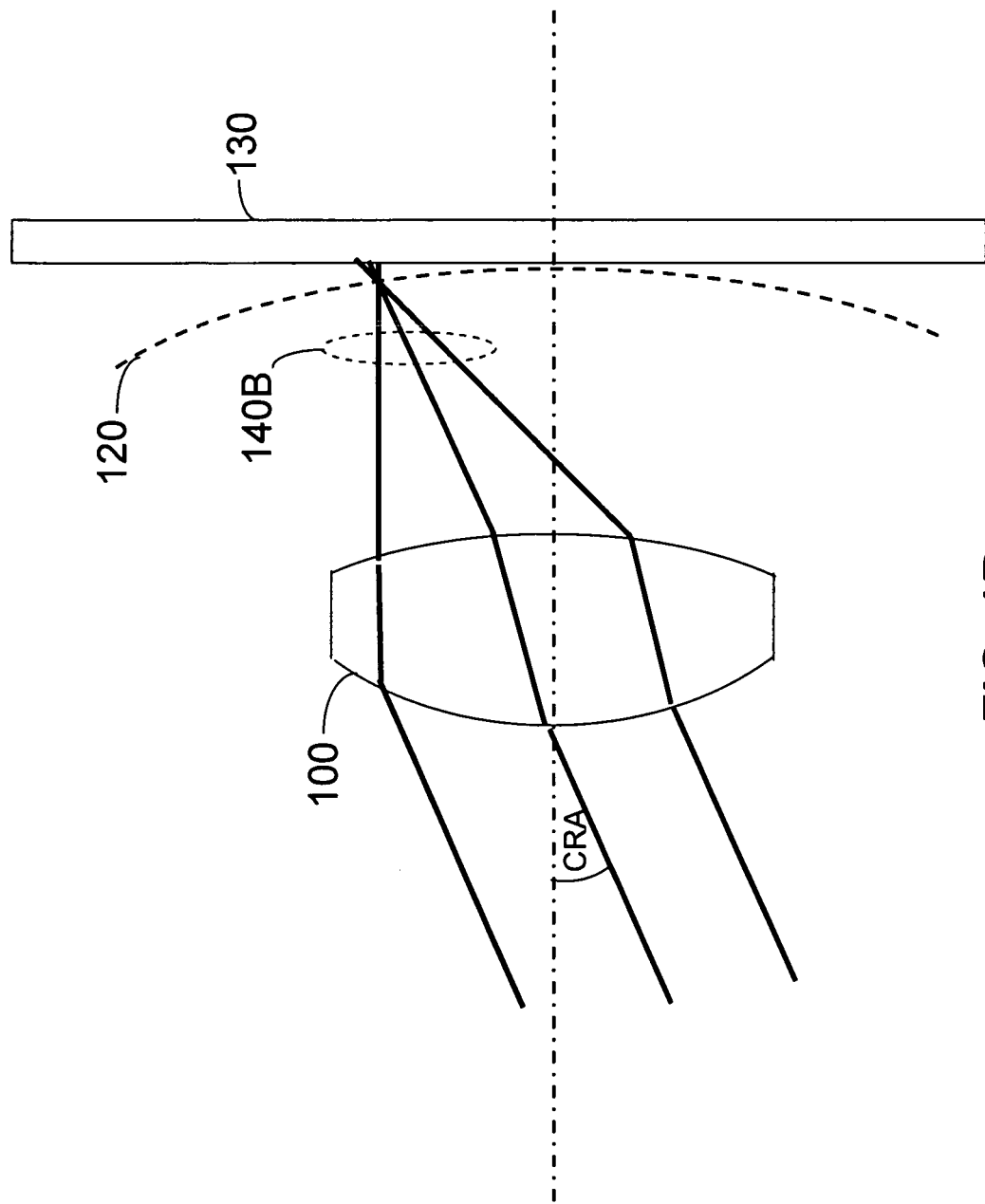

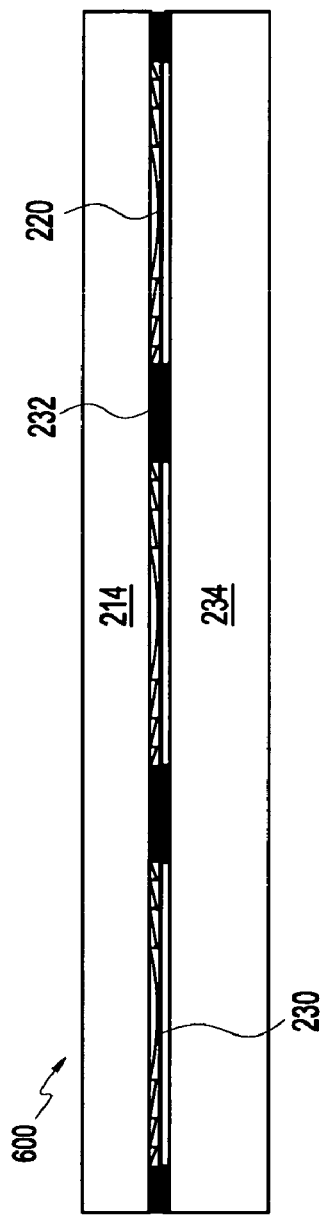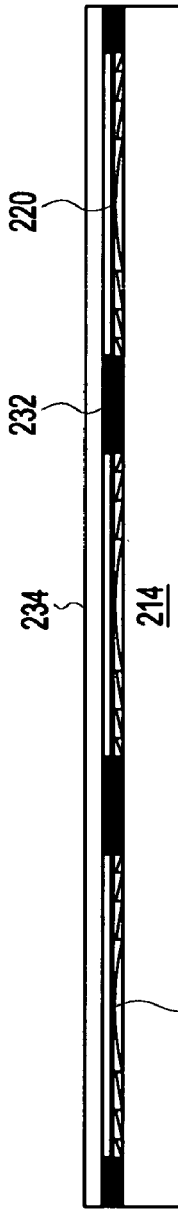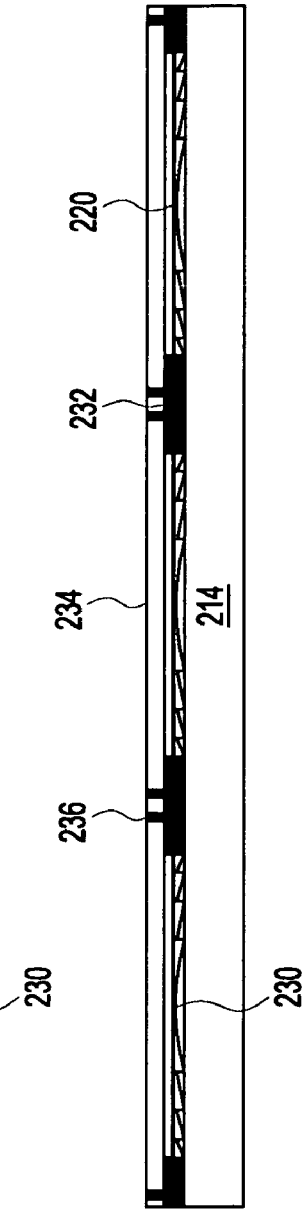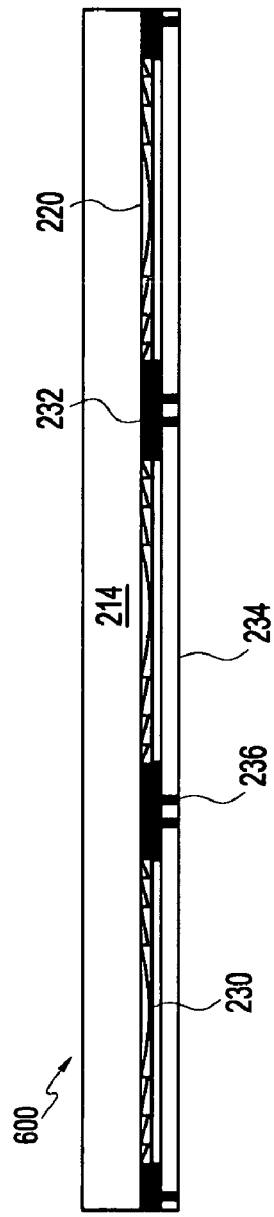

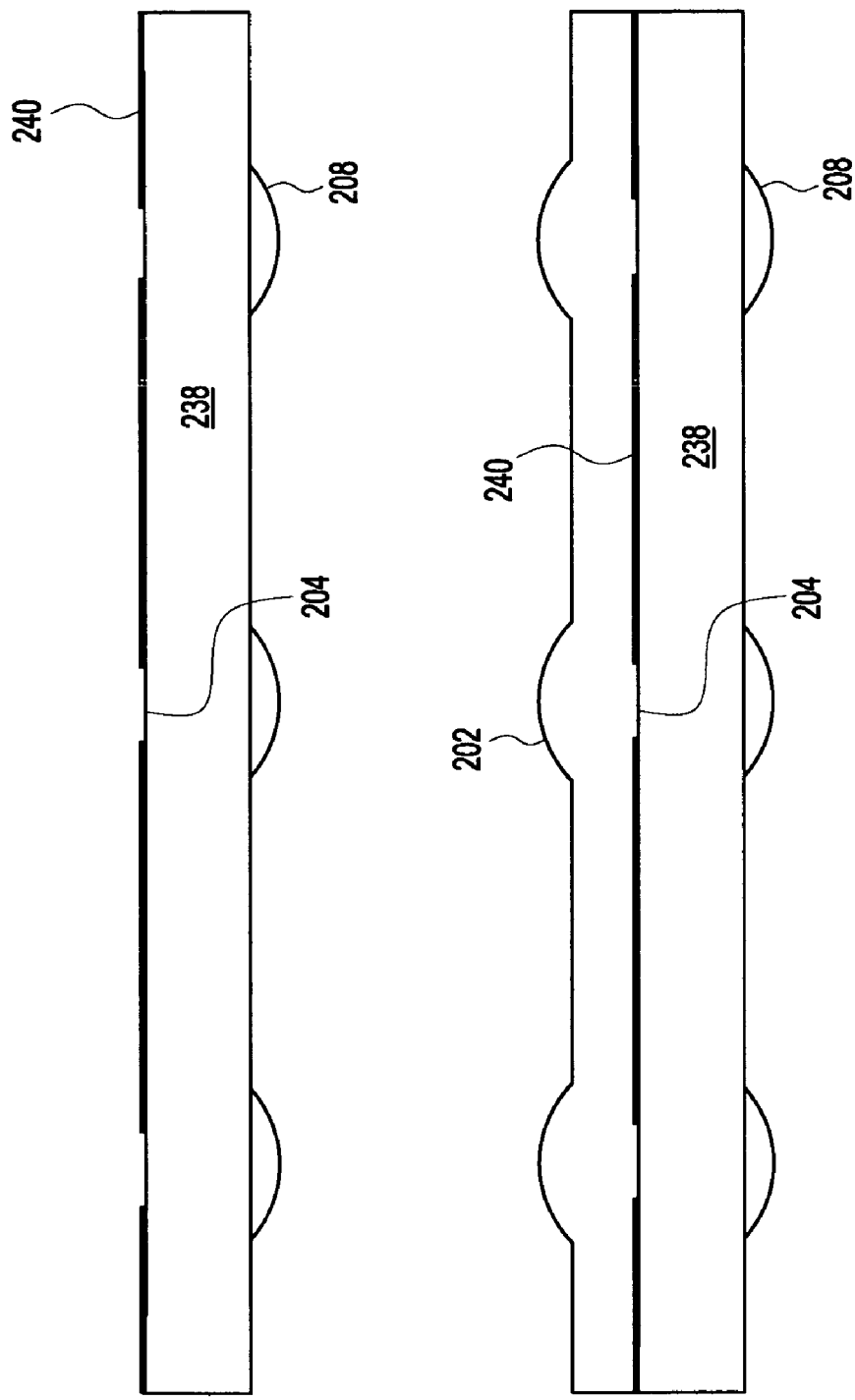

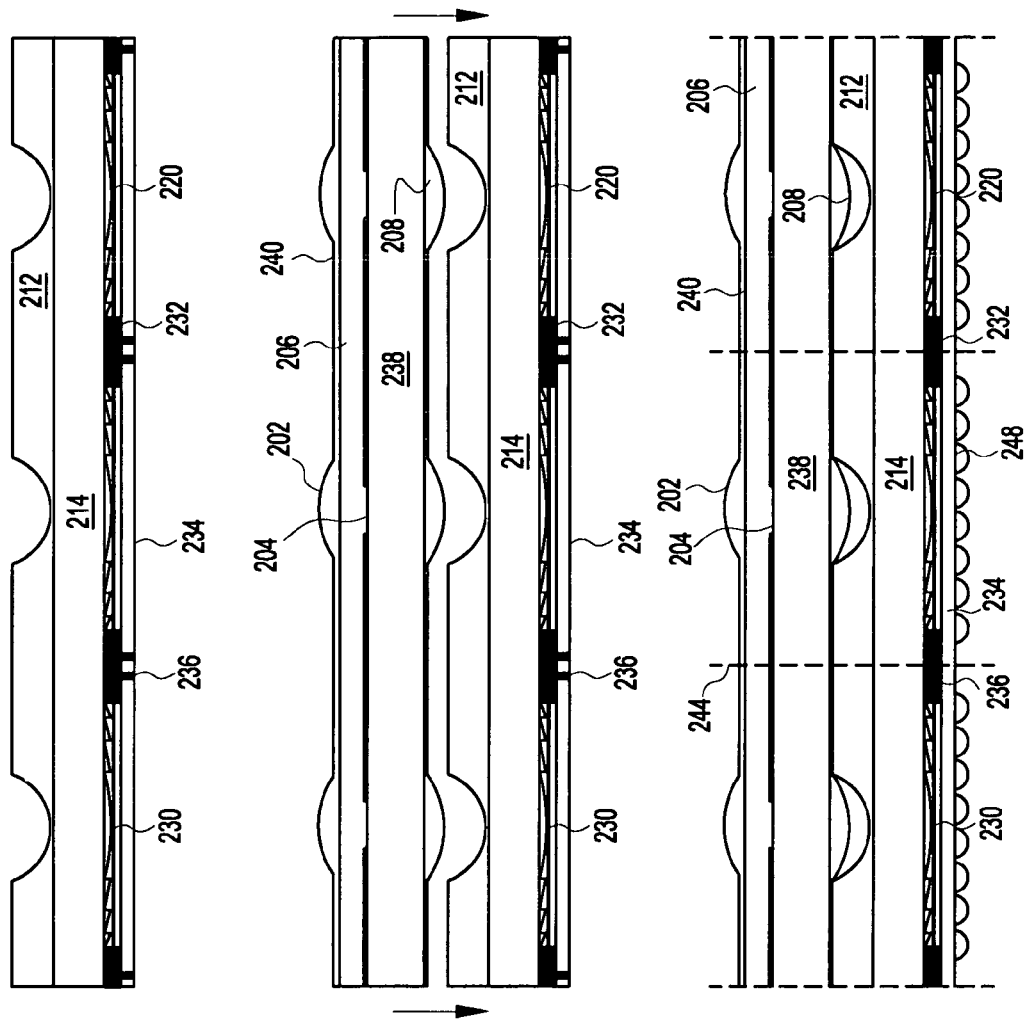

METHOD AND APPARATUS PROVIDING SINGLET WAFER LENS SYSTEM WITH FIELD FLATTENER

FIELD OF THE INVENTION

Embodiments of the invention relate to correcting the angle of refraction of light exiting a lens.

BACKGROUND

Solid state imaging devices, e.g., CCD, CMOS, and others, include a lens or series of lenses to direct incoming light onto a focal plane array of pixels. Each one of the pixels includes a photosensor, for example, a photogate, photoconductor, or photodiode, overlying a substrate for accumulating photo-generated charge in an underlying portion of the substrate. The charge generated by the pixels in the pixel array is then read out and processed to form an image.

Lenses used to direct light onto a pixel array may cause an optical aberration known as field curvature. Field curvature is a simple lens aberration where the sharpest focus of the lens is on a curved surface, also known as a Petzval surface. Field curvature can be understood as a defocusing with field angle, (i.e., bundles of light having different chief ray angles will be focused at different distances from the lens). Therefore, objects in the center and edges of an image are never perfectly in focus simultaneously.

FIGS. 1A, 1B, and 1C are diagrams of a simple lens 100 focusing a bundle of light rays 140A, 140B, 140C (collectively referred to as "light rays 140") onto a pixel array 130. Each of the bundles of light rays 140A, 140B, 140C, has a different chief ray angle CRA and are each optimally focused at a curved focal surface 120. However, since the pixel array 130 is a flat, (i.e., plano), surface, light rays 140B, 140C having larger chief ray angles CRA striking the edge of the pixel array 130 are more unfocused and will appear more blurry in a produced image. The captured image appears sharp and crisp in the center of the image, but is blurry at the edges.

What is needed is a system and method by which light rays are better focused onto a planar pixel array of an imaging device.

BRIEF DESCRIPTION OF THE DRAWINGS

FIGS. 1A-1C show a bundle of light rays being focused through a lens onto a pixel array.

FIGS. 6A-6H show process steps in a method of making a CMOS imager wafer having a cover glass and Fresnel lens according to an embodiment described herein.

FIGS. 8D-8E show process steps in a method of making top lenses.

FIGS. 10A-10C show process steps in a method of joining a lens wafer to a CMOS imager wafer according to an embodiment described herein.

DETAILED DESCRIPTION

In the following detailed description, reference is made to the accompanying drawings which form a part hereof, and in which are shown by way of illustration of specific embodiments that may be practiced. These embodiments are described in sufficient detail to enable those of ordinary skill in the art to make and use them, and it is to be understood that structural, logical or procedural changes may be made to the specific embodiments disclosed herein.

Figure 1C:
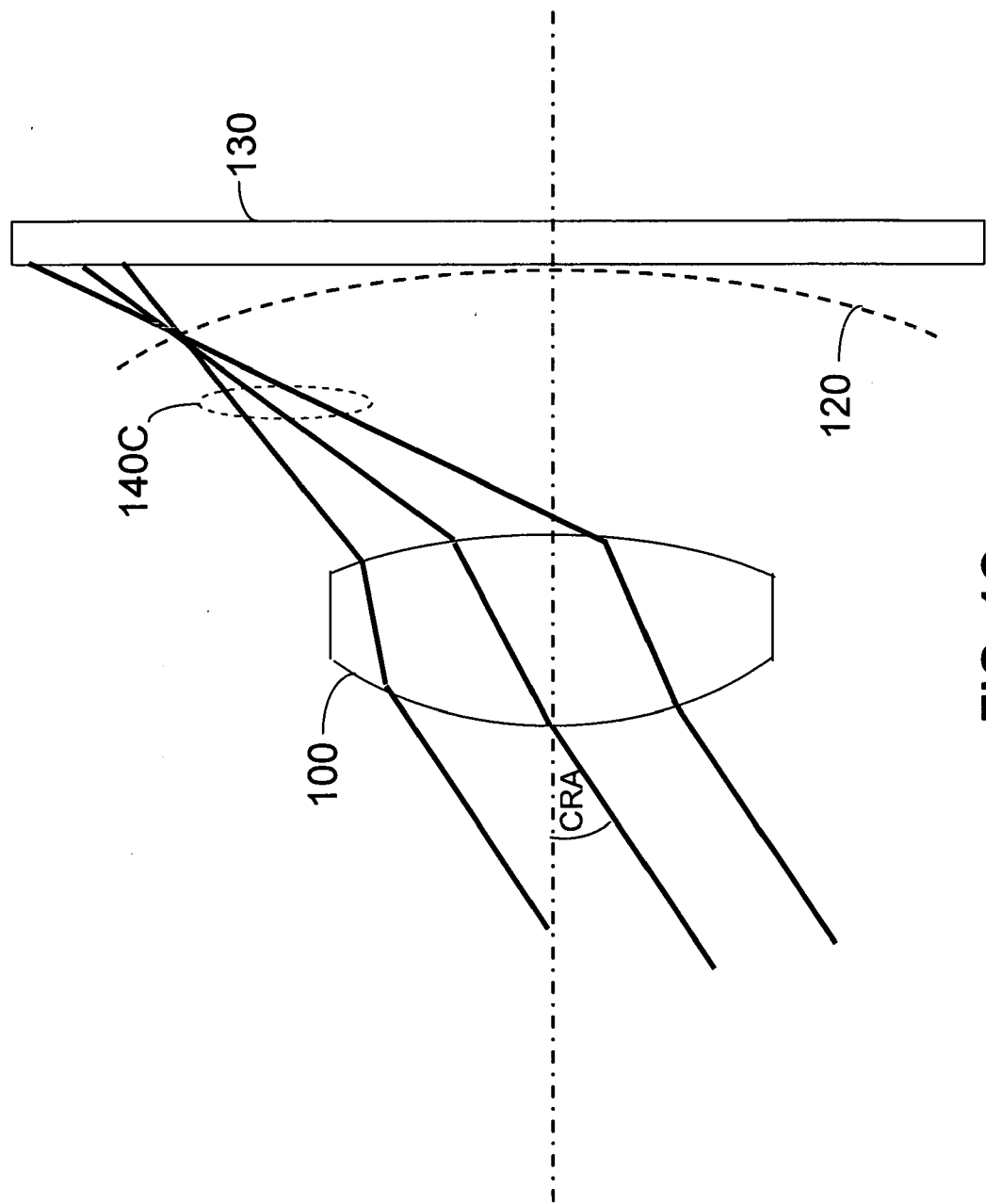
Figure 2:
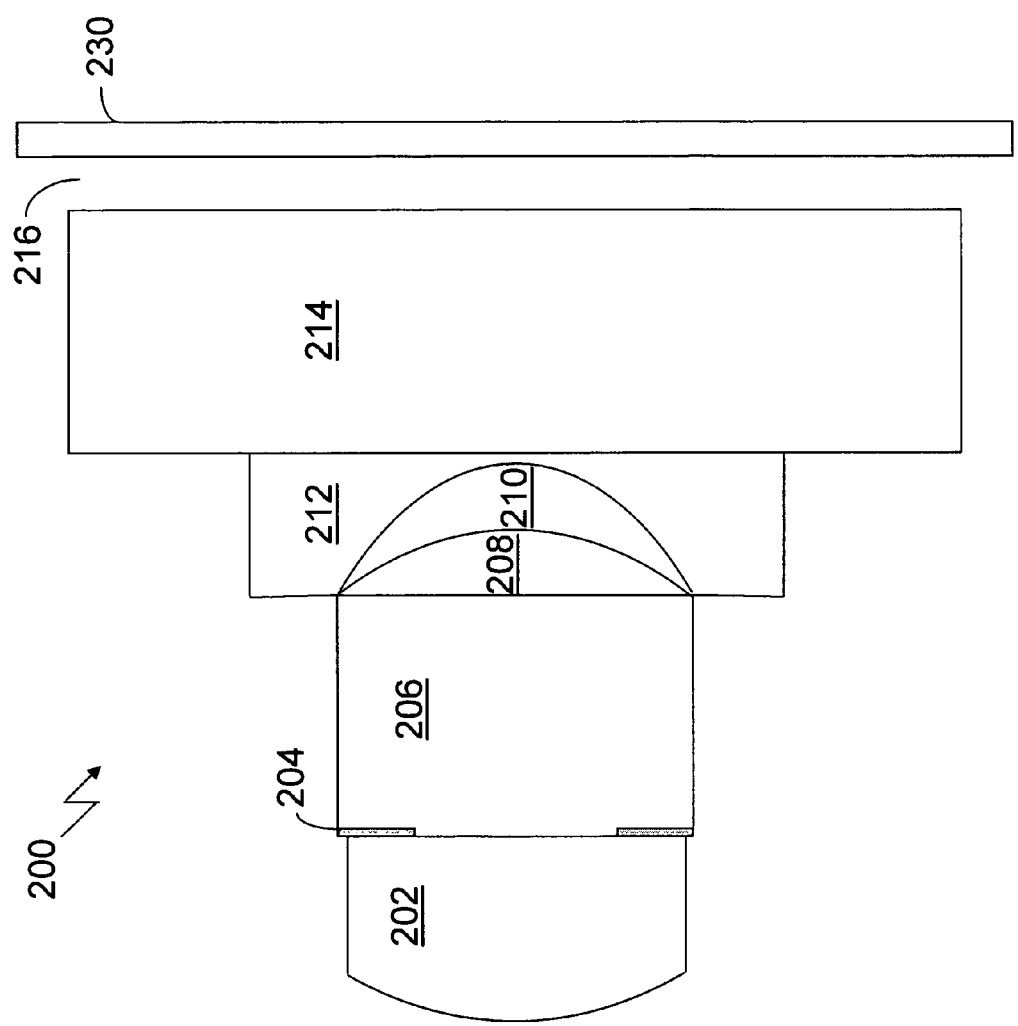
FIG. 2 shows a lens and pixel array according to an embodiment described herein.

FIG. 2 shows a lens 200 and pixel array 230 according to an embodiment described herein. The lens 200 includes a first lens 202, an optional aperture 204, an optional first substrate 206, a second lens 208, a first spacing 210, a field flattening lens 212, an optional second substrate 214, and a second spacing 216. Optionally, the first substrate 206 may be integrated with the first lens 202 and/or the second lens 208 and the second substrate 214 may be integrated with the field flattening lens 212.

The first lens 202 and the second lens 208 are convex lenses arranged such that their convex surfaces are facing in opposite directions. The field flattening lens 212 is a concave lens arranged such that its concave surface faces the second lens 208. The first lens 202, first substrate 206, second lens 208, field flattening lens 212, and second substrate 214 are made of transparent materials, e.g., glass or a polymer. The first spacing 210 and the second spacing 216 may be made up of a gas, e.g., air, or a transparent solid material, e.g., glass or a polymer.

Figure 3A:
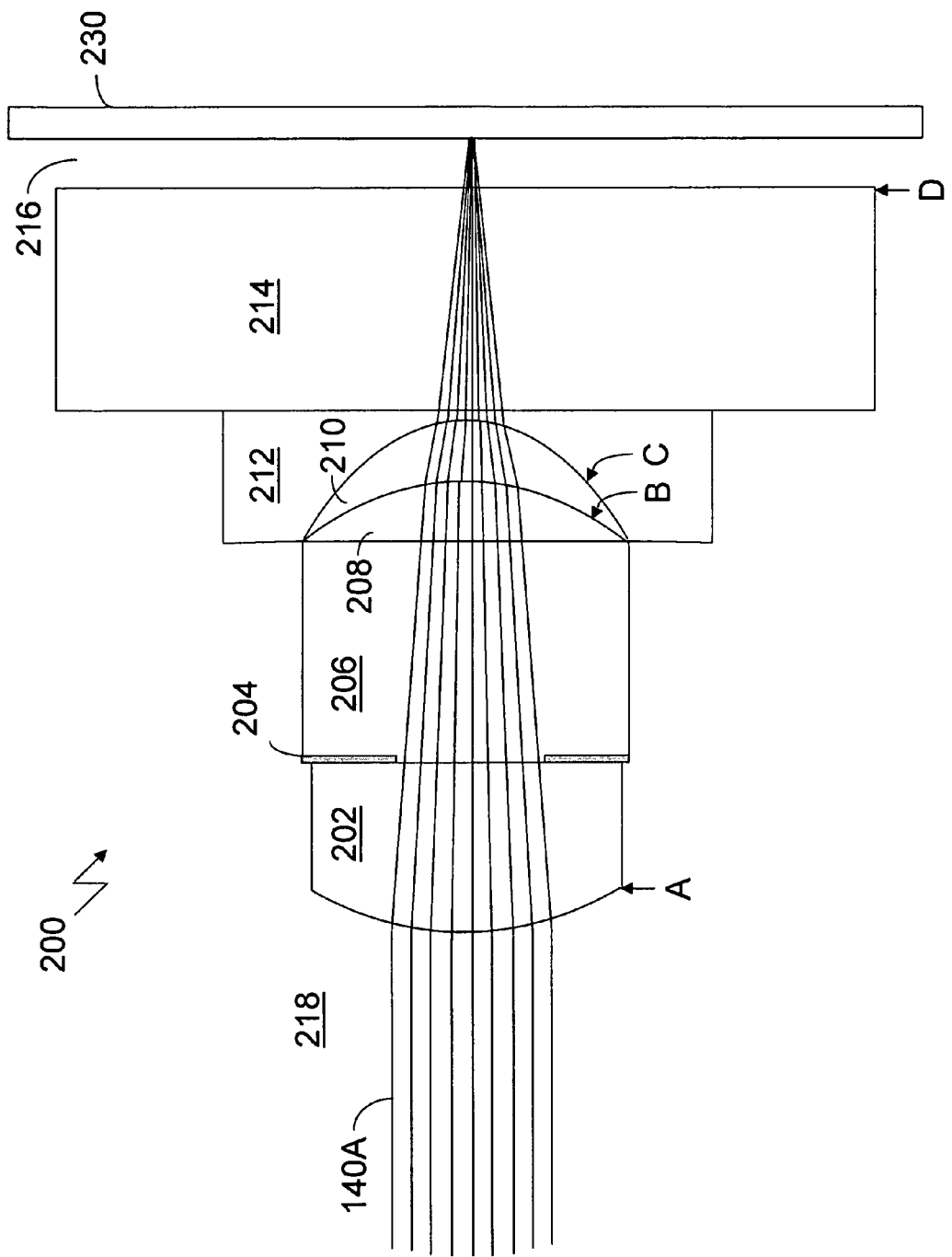
FIGS. 3A-3B show a lens focusing a bundle of light rays onto a pixel array according to an embodiment described herein.

FIG. 3A is a diagram of a bundle of light 140A passing through air 218 into the lens 200 and impinging upon the pixel array 230. In the lens 200 of FIG. 3A, the first lens 202, first substrate 206, second lens 208, field flattening lens 212, and second substrate 214 have the same or similar indices of refraction so that light is not refracted or not strongly refracted at their respective interfaces. However, light will be strongly refracted at the interfaces at the first spacing 210 and second spacing 216. In other embodiments, the first lens 202, first substrate 206, second lens 208, field flattening lens 212, and second substrate 214, may be made of different materials having different indices of refraction n.

In the FIG. 3A lens 200, the first spacing 210 and the second spacing 216 have an index of refraction that is lower than that of the other lens elements 202, 206, 208, 212, 214. In other embodiments, the first spacing 210 and second spacing 216 may have indices of refraction different from each other, so long as the first spacing 210 has a lower index of refraction than that of the second lens 208 and the field flattening lens 212 and the second spacing 216 have an index of refraction that is lower than that of the second substrate 214.

Due to the differences in the indices of refraction between the elements of the lens 200, light rays 140A are refracted at the interfaces between the outside air 218 and the first lens 202 (arrow A), the second lens 208 and the first spacing 210 (arrow B), the first spacing 210 and the field flattening lens 212 (arrow C), and the second substrate 214 and the second spacing 216 (arrow D). The chief ray of the bundle of light rays 140A passing through the center of the aperture 204 has a chief ray angle perpendicular to the pixel array 230 and is therefore focused onto the center of the pixel array 230.

Figure 3B:
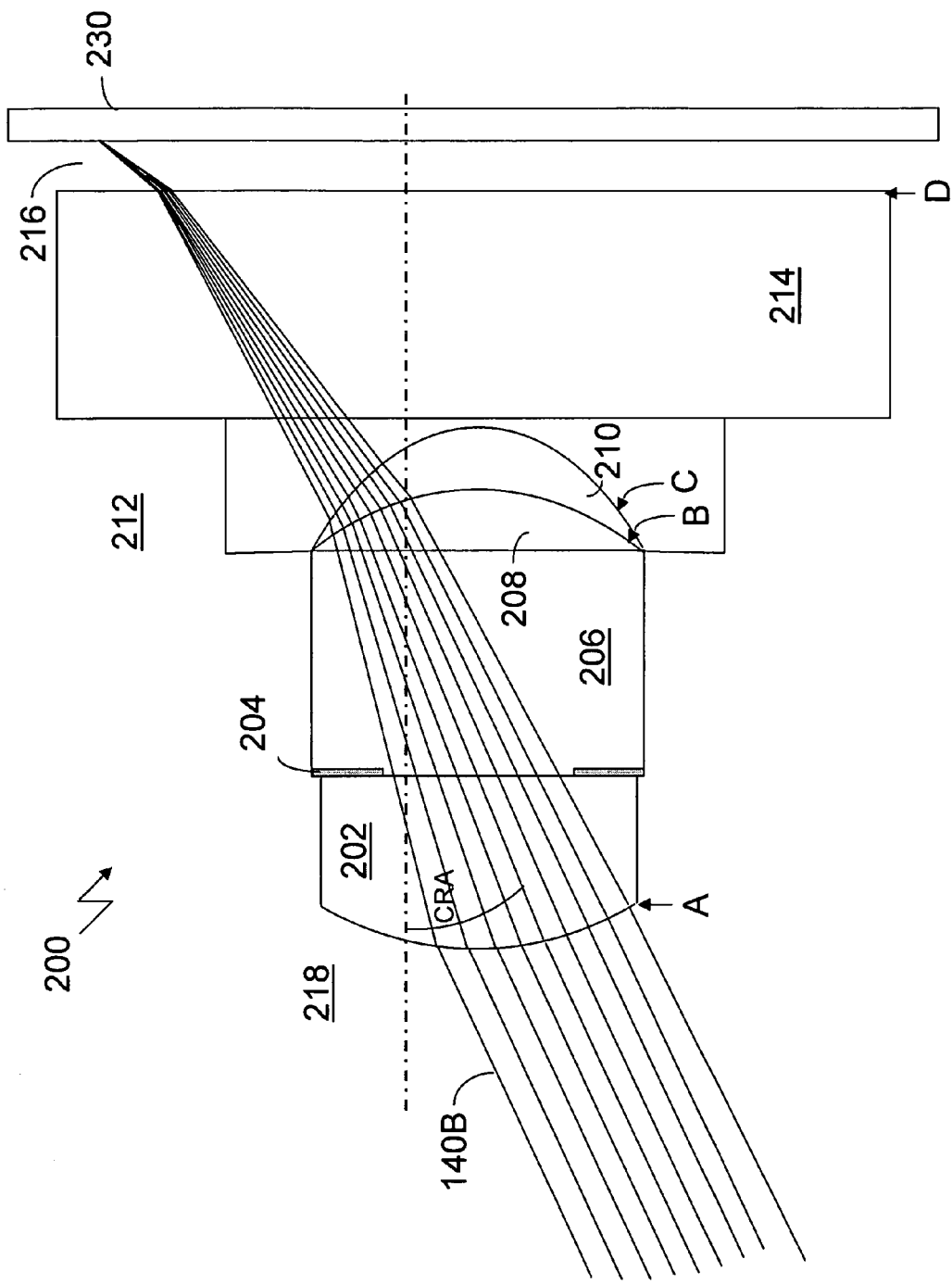

FIG. 3B is a diagram of a bundle of light 140B passing through air 218 into the lens 200 and impinging upon the pixel array 230. The bundle of light 140B has a chief ray angle CRA that is not perpendicular to the pixel array 230. The interfaces between the second lens 208 and the first spacing 210 (arrow B) and the first spacing 210 and the field flattening lens 212 (arrow C) serve to refract the bundle of light 104B so that the focus point of the bundle of light 104B falls on the plano surface of the pixel array 230 rather than at a Petzval plane located in front of the pixel array 230.

The use of the first spacing 210 and the field flattening lens 212 introduces a longer optical path length for bundles of light 140B with increasing chief ray angles to correct for the Petzval focusing plane. The higher index material of the field flattening lens 212 and the substrate 214 in the optical path of the light 140B increases the optical path length by approximately the refractive index of the field flattening lens 212 and the substrate 214. The concave surface of the field flattening lens 212 increases the chief ray angle to allow a bundle of light 140B to propagate through the second substrate 214 under a larger angle to lengthen the optical path.

Figure 4A:
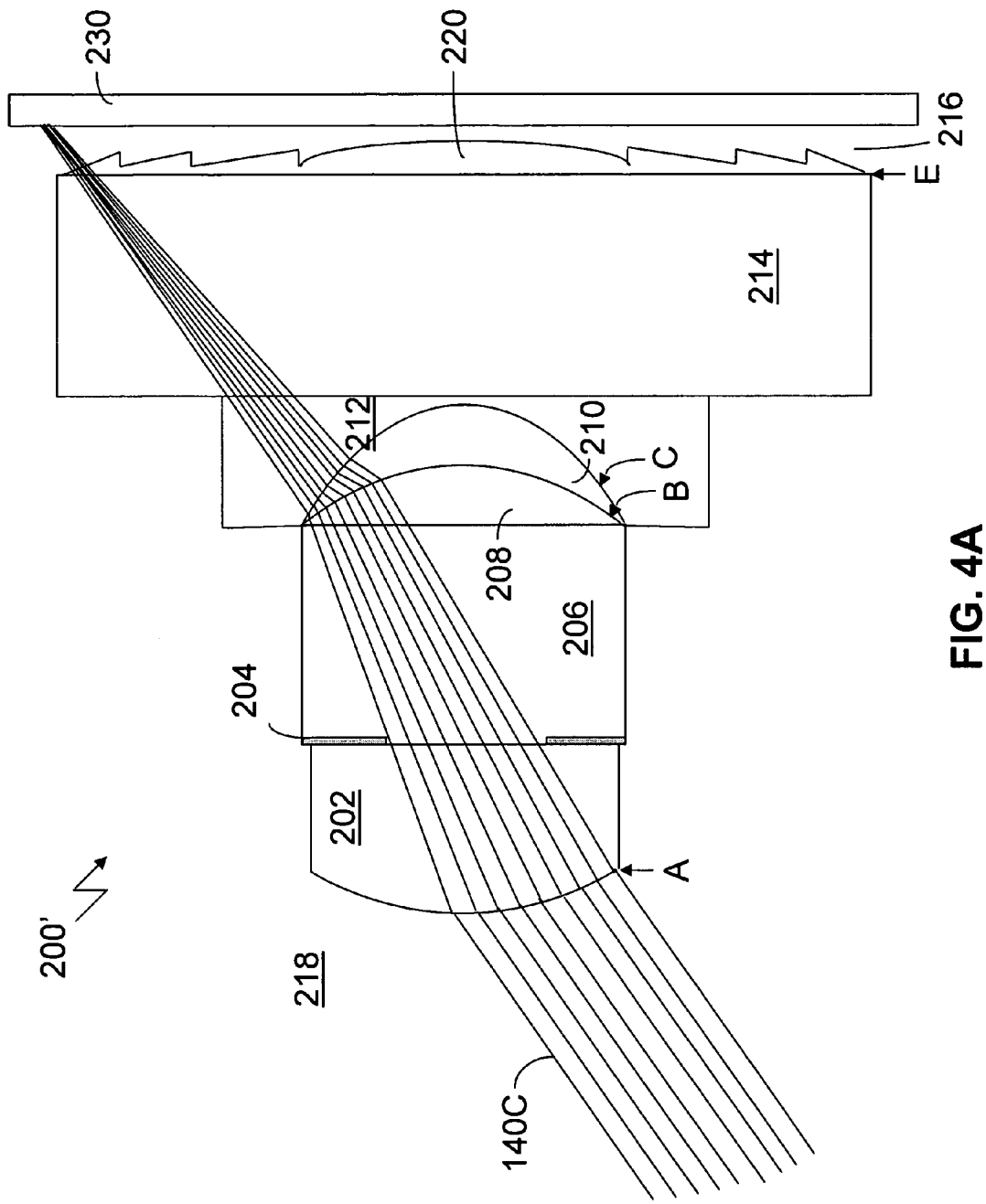
FIG. 4A shows a lens focusing a bundle of light rays onto a pixel array according to an embodiment described herein.

FIG. 4A is a diagram of a bundle of light 140C passing through air 218 into the lens 200' and impinging upon the pixel array 230, where the lens 200' includes a Fresnel lens 220. The Fresnel lens 220 is arranged between the second substrate 214 and the second spacing 216. The Fresnel lens 220 reduces the chief ray angle of the bundle of light 140C in the second spacing 216 by refraction so that the chief ran angle in the second spacing 216 is the same or less than the chief ray angle of the bundle of light 140C in the second substrate 214. The index of refraction of the Fresnel lens 220 may be the same as or similar to that of the second substrate 214 so that light 140C is not refracted or not refracted strongly at the interface between the two (arrow E).

The Fresnel lens 220 provides greater slopes for bundles of light 140C having greater chief ray angles. The use of a Fresnel lens 220 in the lens 200' is advantageous compared to a conventional convex lens having a similar focusing power because, unlike a conventional convex lens, the Fresnel lens 220 can be incorporated into the lens 200' without introducing additional thickness. Furthermore, the additional thickness introduced by a conventional convex lens would provide greater distance between the conventional convex lens and the pixel array 230 for bundles of light 140C having greater chief ray angles, which would lessen the field flattening effect achieved by the lens 200'.

Figure 5A:
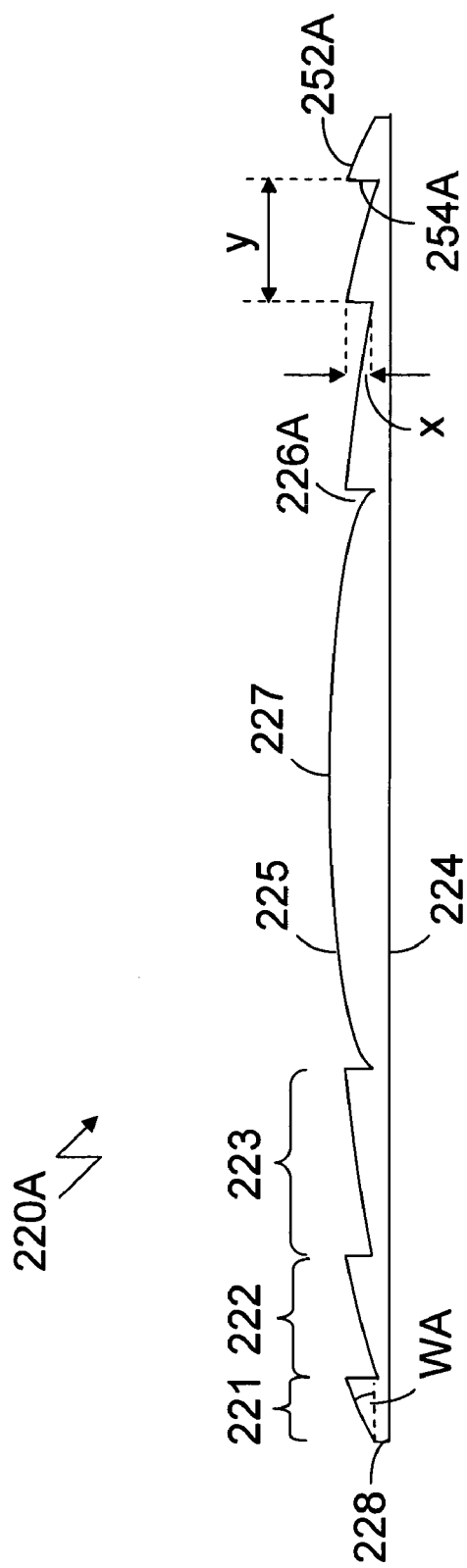
FIGS. 5A-5D show Fresnel lenses according to embodiments described herein.

FIG. 5A is a diagram of a Fresnel lens 220A according to an embodiment described herein. The Fresnel lens 220A is formed as a folded convex lens, (i.e., portions 221, 222, 223 of a convex lens are divided into segments and arranged on the same level). The Fresnel lens 220A includes a planar surface 224 that faces the second substrate 214 (FIG. 4A) and a surface 225 that includes a faceted structure that faces the pixel array 230 (FIG. 4A) and is made up of a series of facets 226A arranged in concentric rings around the center 227 of the Fresnel lens 220A. The rings may be circles or irregularly shaped rings. The facets 226A include a working side 252A and a back folding side 254A. Because the Fresnel lens 220A is formed as a folded convex lens, the working sides 252A may be convexly curved. The Fresnel lens 220 may be made of a transparent material, such as glass or a polymer. In one embodiment, the Fresnel lens 220 may be made of an ultra-violet-cured polymer.

The Fresnel lens 220A has facets 226A of constant depth x and periods y that decrease with distance from the center 227. In one embodiment, the depth x of the facets 226A are in the order of magnitude of, or between, five and fifty microns, and with minimum periods y at the outer edge 228 between five and fifty microns depending on the desired optical power and diameter of the Fresnel lens 220A. The periods y are much larger at the center 227 of the Fresnel lens 220A since the working angles WA are much lower closer to the center of the lens 220A compared with the periphery. The increase in the working angle WA of facets 226A located further from the center 227 causes light rays exiting the Fresnel Lens 220A at a location further from the center 227 to be transmitted through the facet perpendicularly even for a high angle as well as light rays exiting the Fresnel lens 220A at a location closer to the center 227. Although the Fresnel lens 220A shown in FIG. 5A only includes three facets 226A, it should be understood that Fresnel lenses according to embodiments described herein may have tens, hundreds, or thousands of facets arranged on the Fresnel lens according to the size of the facets and the size of the particular Fresnel lens.

As shown in FIG. 4A, the focal length of a Fresnel lens 220 may be determined by assuming that it is desired to maintain the chief ray angle of a bundle of light 140C at the same angle in the second spacing 216 as it is in the second substrate 214. In this case, as shown in FIG. 5A, the working angle at a given radial position is arranged to be at an angle so that the working side 252A of the facet 226A through which light 140C passes is perpendicular to the corresponding light 140C from the second glass substrate 214 (FIG. 4A) falling on a respective working side 252A. The effective radius of curvature of the Fresnel lens 220A equals the maximum radial position, which is determined as the radius of the Fresnel lens 220A divided by the sinus of the maximum angle of incidence, i.e., a light ray having the largest angle that is desired to reach the pixel array 230. This method may be used regardless of whether the facets 226 have straight 226C (FIG. 5C), 226D (FIG. 5D) or curved 226A (FIG. 5A), 226B (FIG. 5B) sides. The radius of curvature of the Fresnel lens 220A may be further reduced if it is desired to bend the chief ray angle of the bundle of light 140 further towards the center of the pixel array 230 in the second spacing 216 compared to the chief ray angle in the second substrate 214.

Figure 5B:
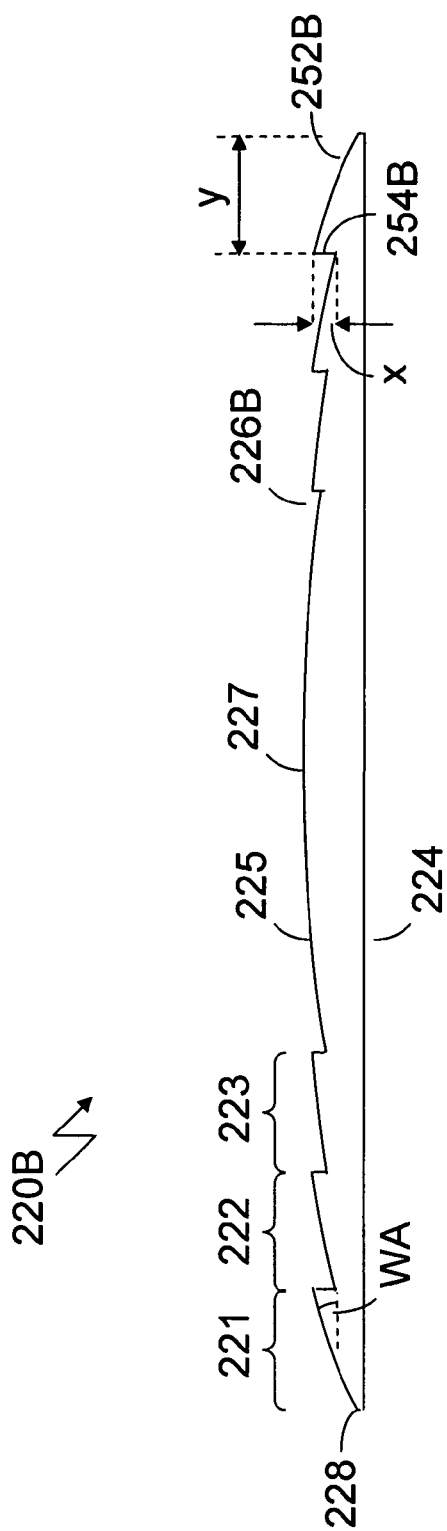

FIG. 5B is a diagram of a Fresnel lens 220B according to another embodiment described herein. The Fresnel lens 220B is also formed as a folded convex lens. The Fresnel lens 220B has facets 226B of a constant period y and depths x that increase with distance from the center 227. The depth of the facets 226B are much more shallow at the center 227 of the Fresnel lens 220B since the working angles WA are much lower.

Figure 5C:
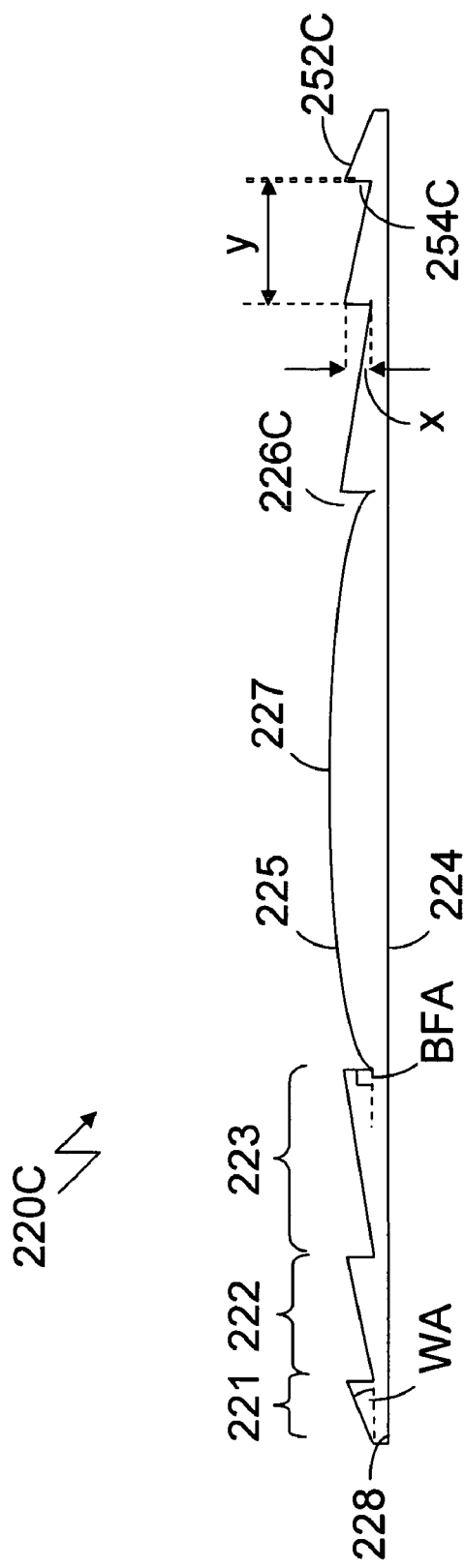

For ease of manufacturing, a Fresnel lens 220C can also be formed as a simple saw-tooth structure with radially varying working angles WA. FIG. 5C is a diagram of a Fresnel lens 220C having facets 226C formed with straight working sides 252C and back folding sides 254C sides to form a saw-tooth structure. The Fresnel lens 220C has facets 226C of constant depth x and periods y that decrease with distance from the center 227. The working angle WA also increases with distance from the center 227. The Fresnel lens 220C has back folding angles BFA of ninety degrees that are constant among all of the facets 226C.

Minimum stray or false light generation by the Fresnel lens 220 can be expected when the back folding side 254 in general is parallel to the chief ray of each corresponding ray bundle falling on or transmitted through a facet (at any radial position and for the corresponding angle). The back folding angle BFA is formed so that the back folding side 254 will be substantially parallel to the chief ray angle falling on a respective back folding side 254. In this case the angle between the back folding side 254 and the working side 252 will be ninety degrees. Alternatively, back folding angles WA may be chosen such that the back folding sides 254 produce spurious light, but the spurious light primarily is reflected away from the image sensor 230.

Figure 5D:
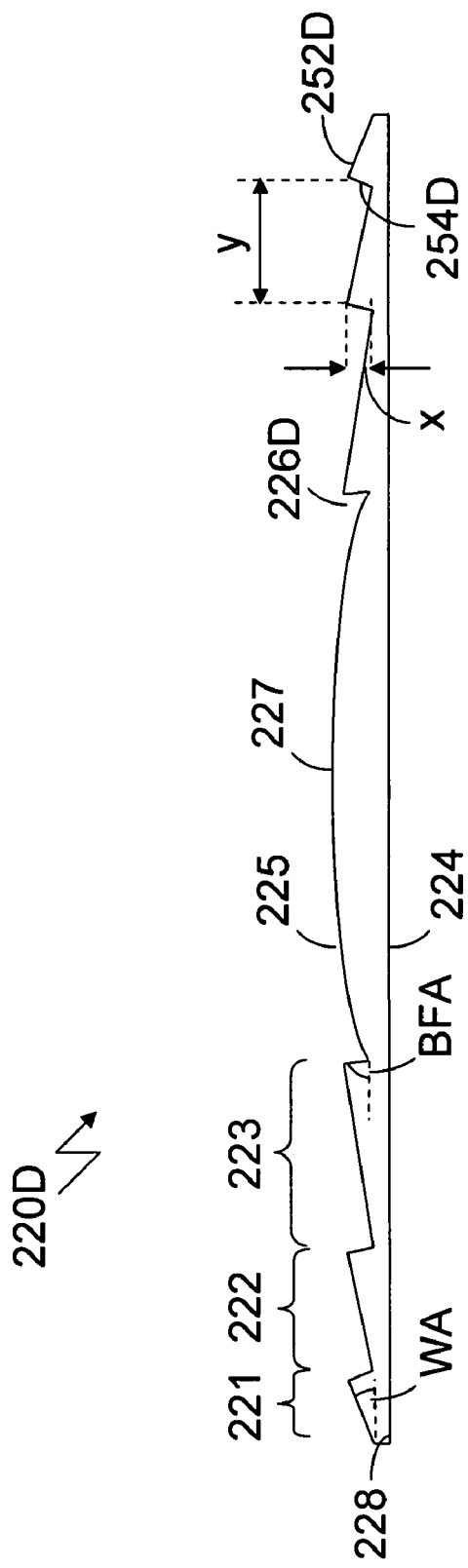

FIG. 5D is a diagram of a Fresnel lens 220D having facets 226D formed with straight working sides 252D and back folding sides 254D sides and having constant depth x and periods y and that decrease with distance from the center 227. The Fresnel lens 220D has working angles WA that increase with distance form the center 227 and back folding angles BFA that degrease with distance from the center 227. The angle between the back folding sides 254D and the working sides 252D can form a ninety degree angle.

In another embodiment, the number of facets 226 that a given bundle of light 140 passes through is more than one. The distance of the Fresnel lens 220 to the pixel array 230 and the period y of the facets 226 may be correspondingly chosen.

Figure 6A:
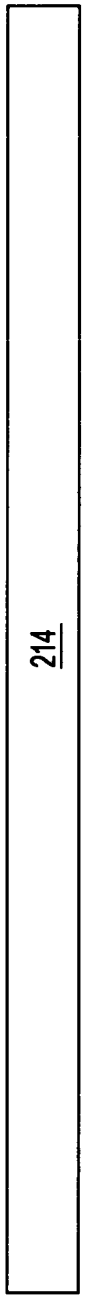
Figure 6B:
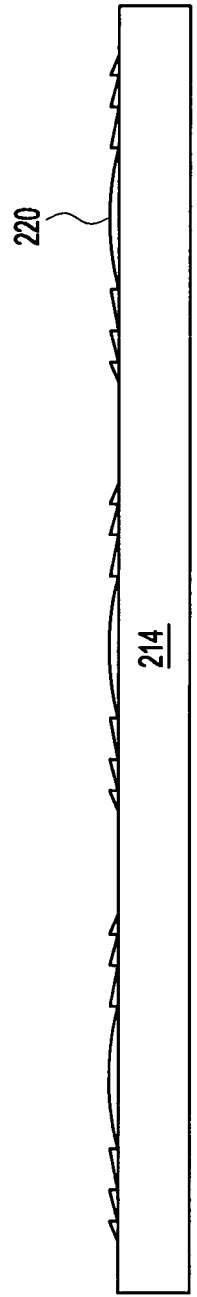
Figure 6C:
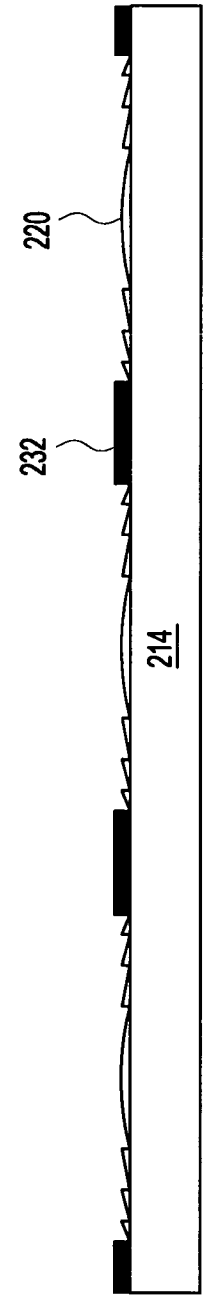
Figure 6D:
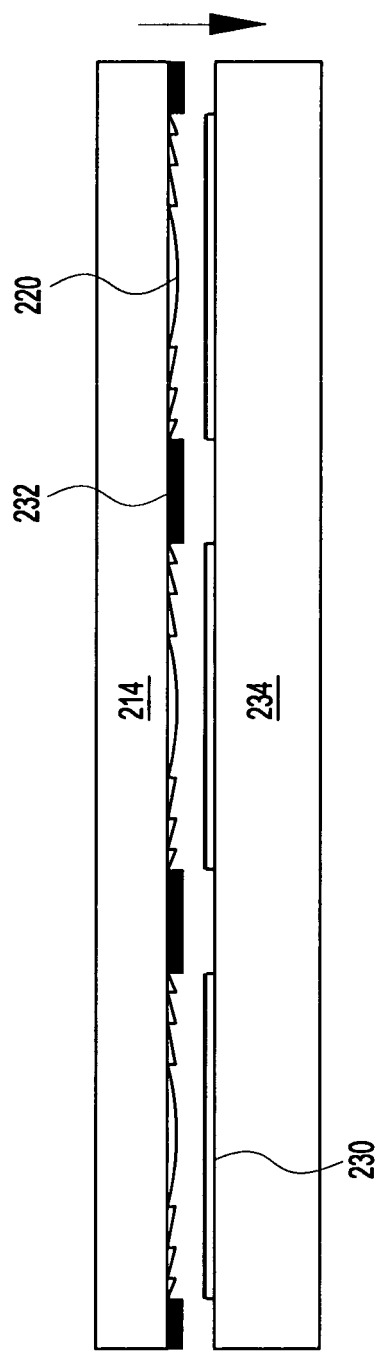

FIGS. 6A-6H show process steps in a method of making a CMOS imager wafer having a plurality of cover glasses and associated Fresnel lens according to an embodiment described herein. As shown in FIG. 6A, a second substrate 214, usually also known as a cover glass wafer, is prepared to the desired thickness and flatness. As shown in FIG. 6B, Fresnel lenses 220 are formed in polymer on the second substrate 214 by ultraviolet imprint replication or by any appropriate method. As shown in FIG. 6C, patterned spacers 232 are formed on the second substrate 214 between the Fresnel lenses 220 using a photo-definable epoxy, screen print, or dispense process. In another embodiment, the patterned spacers 232 may be formed at the same time as the Fresnel lenses 220 using ultra violet imprint replication. As shown in FIG. 6D, the second substrate 214 is flipped and, as shown in FIG. 6E, is bonded to a third wafer substrate 234 having pixel arrays 230 formed thereon at locations corresponding to the Fresnel lens 220. The imager wafer 600 is now ready for a through wafer interconnect process and packaging process described below.

As shown in FIG. 6F, the third substrate 234 is thinned to a desired thickness. In the through wafer interconnect process shown in FIG. 6G, the through wafer interconnects 236 are formed through the third substrate 234 backside and connected to conductive tracers formed on the surface of substrate 234. As shown in FIG. 6H, the completed imager wafer 600 with the second substrate 214 as a cover glass and the Fresnel lens 220 is ready for lens integration (described below).

Figure 7A:
FIGS. 7A-7D show process steps in a method of making a bottom lens wafer according to an embodiment described herein.
Figure 7B:
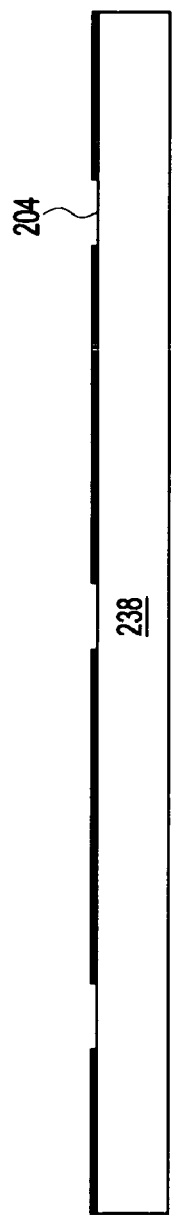
Figure 7C:
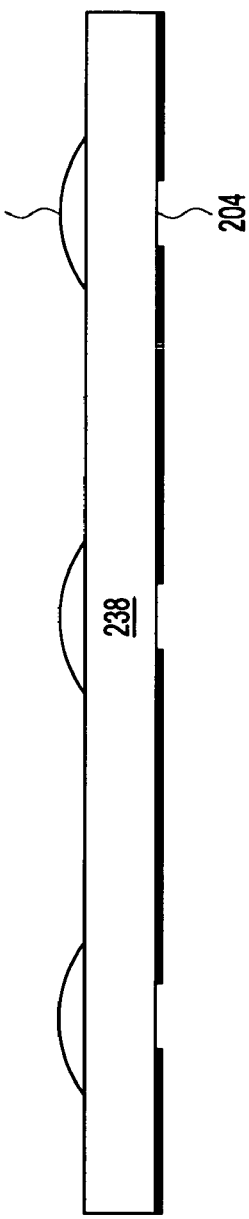
Figure 7D:
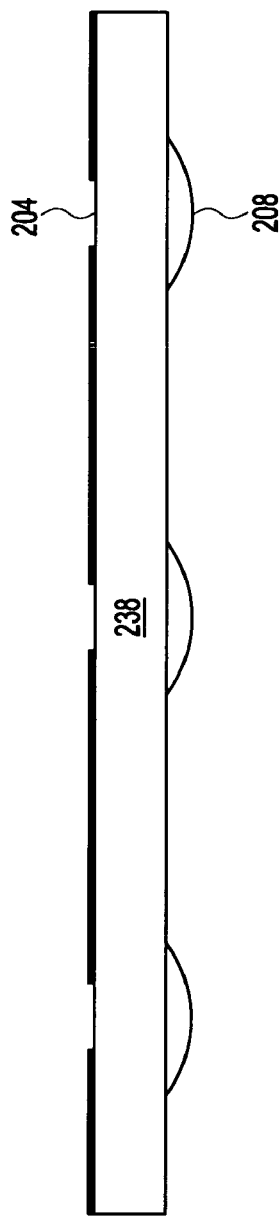

FIGS. 7A-7D show process steps in a method of making a bottom lens wafer according to an embodiment described herein. As shown in FIG. 7A, a bottom lens wafer 238 is prepared to the desired thickness and flatness. As shown in FIG. 7B, apertures 204 are formed on the bottom lens wafer 238. The apertures 204 may be defined by metal patterns, by black photo-definable material, or by any other suitable technique. As shown in FIG. 7C, the bottom lens wafer 238 is flipped and second lenses 208 are formed by ultraviolet imprint replication. A completed bottom lens wafer 238 is shown in FIG. 7D.

Figure 8A:
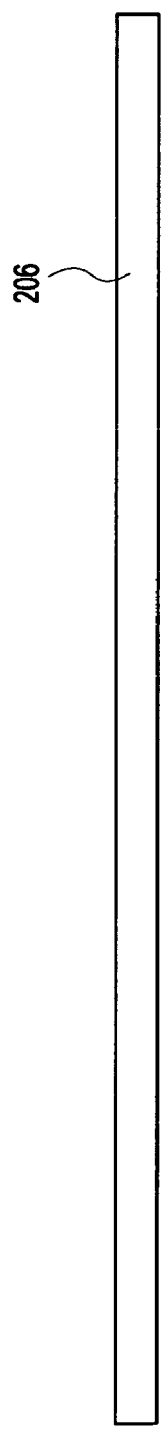
FIGS. 8A-8C show process steps in a method of making a top lens wafer according to an embodiment described herein.
Figure 8B:
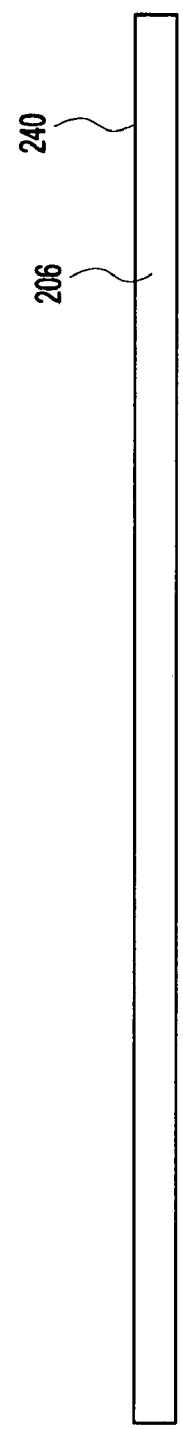
Figure 8C:
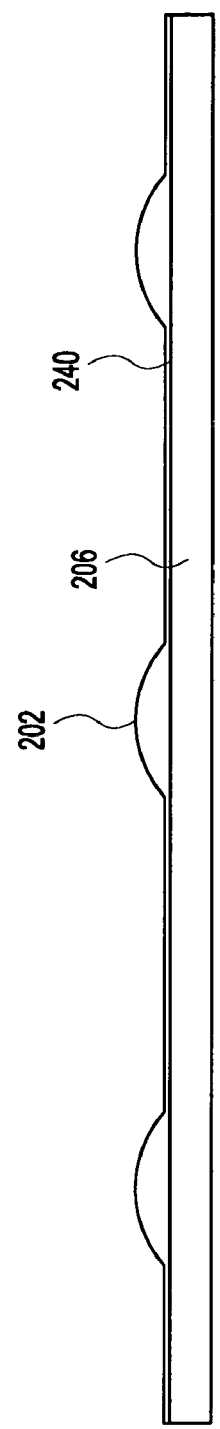

FIGS. 8A-8C show process steps in a method of making a top lens wafer according to an embodiment described herein. As shown in FIG. 8A, a first substrate 206, also known as a top lens wafer, is prepared to the desired thickness and flatness. As shown in FIG. 8B, an infrared cut-off filter 240 is formed on the first substrate 206. As shown in FIG. 8C, first lenses 202 are formed by ultraviolet imprint replication or by any other suitable technique to complete the top lens wafer.

FIGS. 8D-8E show process steps in an alternative method of making first lenses 202. In this embodiment, instead of performing the steps shown in FIGS. 8A-8C, an infrared cut-off filter 240 is formed on the bottom lens wafer 238, as shown in FIG. 8D. As shown in FIG. 8E, first lenses 202 are formed on the infrared cut-off filter 240 by ultraviolet imprint replication or by any other suitable technique. The height of the first lenses 202 may be increased to substitute for the omitted first substrate 206. If the alternative method shown in FIGS. 8D and 8E is used to form the first lenses, the steps shown in 9A and 9B may be omitted, but the remainder of the process may be carried out as described.

Figure 9A:
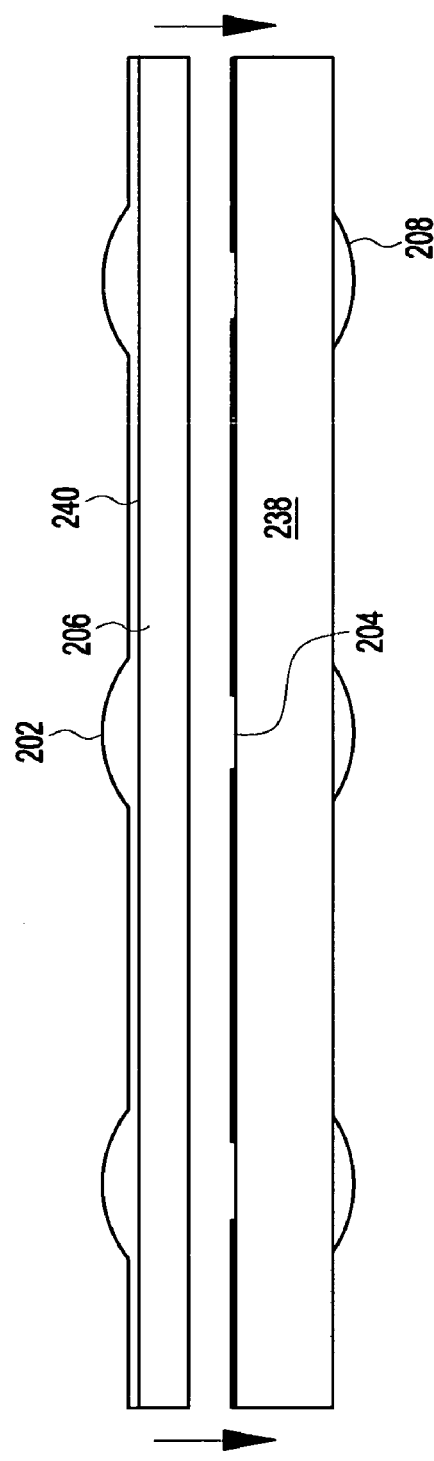
FIGS. 9A and 9B show process steps in a method of joining a top lens wafer to a bottom lens wafer according to an embodiment described herein.
Figure 9B:
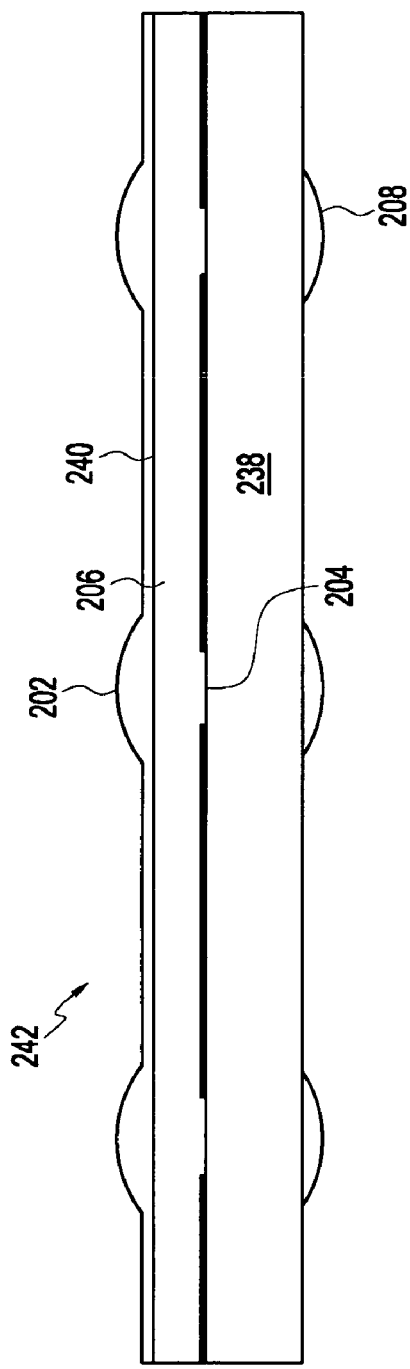

FIGS. 9A and 9B show process steps in a method of joining a top lens wafer to a bottom lens wafer according to an embodiment described herein. As shown in FIG. 9A, the first substrate 206 is bonded to the bottom lens wafer 238. In one embodiment, the first substrate 206 may be bonded to the bottom lens wafer 238 using an ultraviolet adhesive. As shown in FIG. 9B, the combined lens stack 242 is ready for characterization and then stacking with the imager wafer 600. In another embodiment, it is possible to cut the lenses into separate stacks and place them on a completed single imager wafer.

Figure 10D:
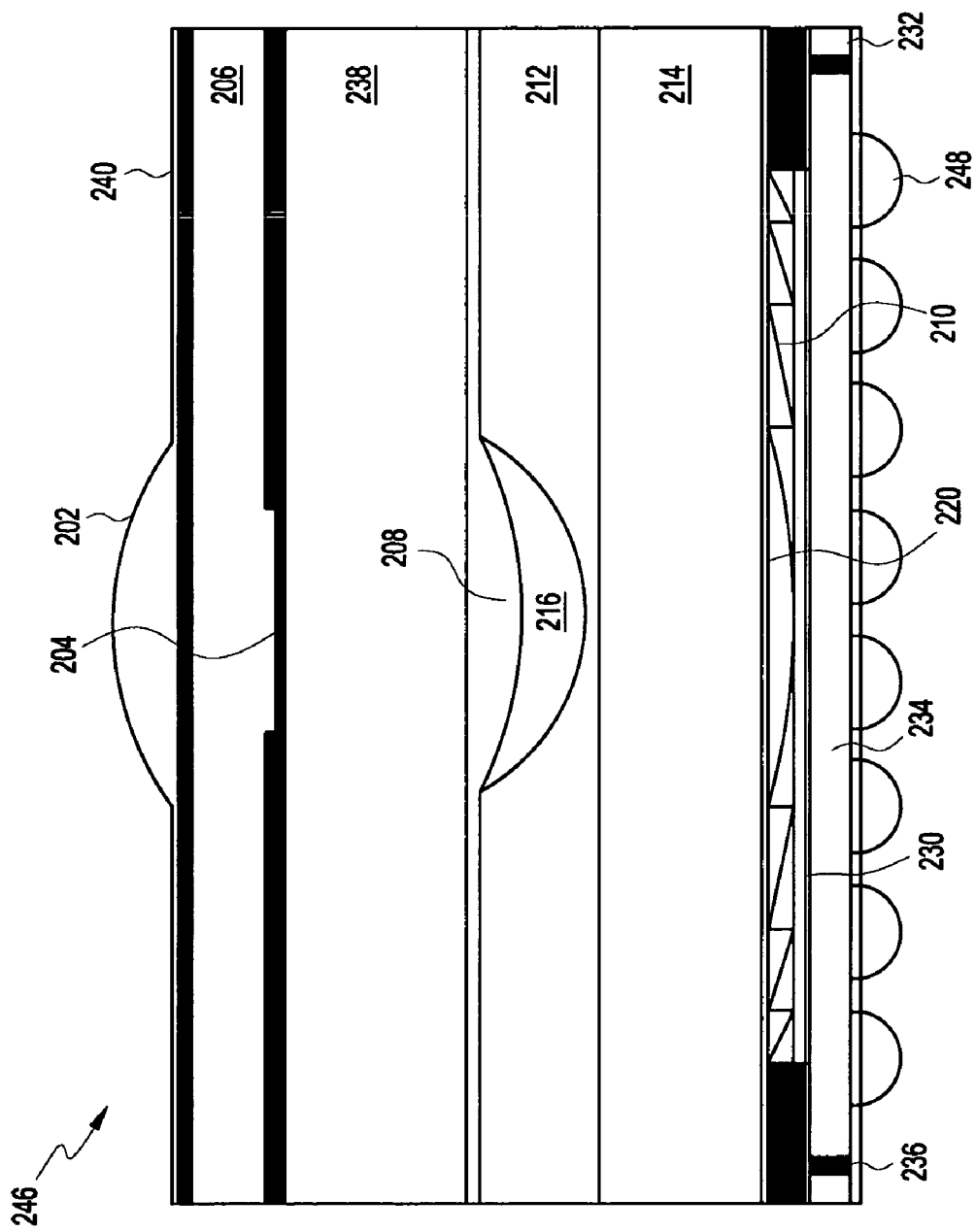
FIG. 10D shows a completed imager module according to an embodiment described herein.

FIGS. 10A-10C show process steps in a method of forming a field flattener lens 212 and joining a lens stack 242 to an imager wafer 600 to form a module 246 according to an embodiment described herein. As shown in FIG. 10A, the field flattener lens 212 is formed on the second substrate 214. In one embodiment, the field flattener lens 212 may be formed by ultraviolet imprint replication or by any other suitable technique. As shown in FIG. 10B, the combined lens stack 242 is bonded to the field flattener lens 212. As shown in FIG. 10C, solder bumps 248 are formed on the backside of the third substrate on the conductive traces and the stack may be separated along lines 244 to form segmented image modules 216. FIG. 10D shows a completed imager module 246.

Figure 11:
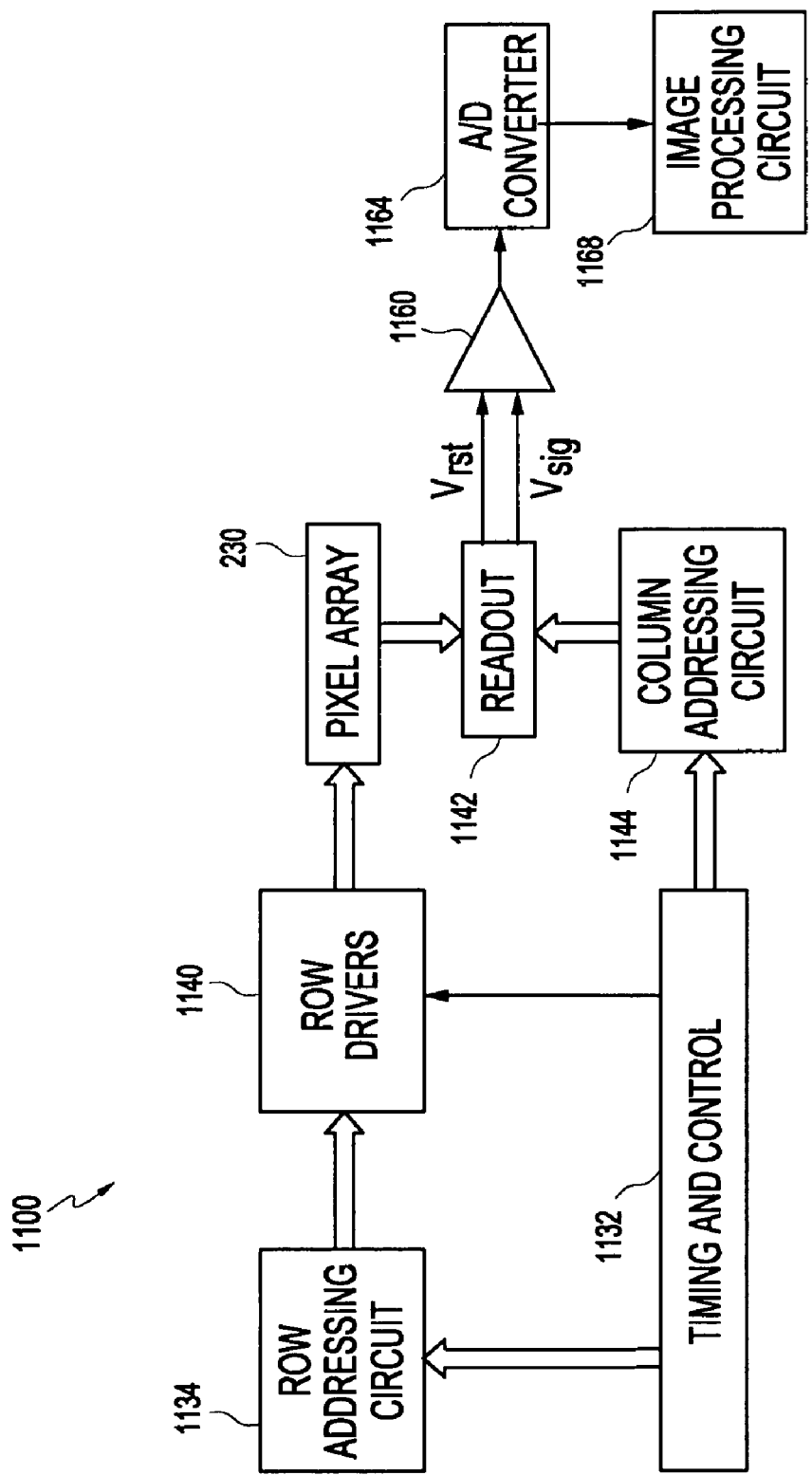
FIG. 11 illustrates a block diagram of a CMOS imaging device constructed in accordance with an embodiment described herein.

FIG. 11 shows a block diagram of an imaging device 1100, (e.g. a CMOS imager), that may be used in conjunction with a lens 200, 200' according to embodiments described herein. A timing and control circuit 1132 provides timing and control signals for enabling the reading out of signals from pixels of the pixel array 230 in a manner commonly known to those skilled in the art. The pixel array 230 has dimensions of M rows by N columns of pixels, with the size of the pixel array 230 depending on a particular application.

Signals from the imaging device 1100 are typically read out a row at a time using a column parallel readout architecture. The timing and control circuit 1132 selects a particular row of pixels in the pixel array 230 by controlling the operation of a row addressing circuit 1134 and row drivers 1140. Signals stored in the selected row of pixels are provided to a readout circuit 1142. The signals are read from each of the columns of the array sequentially or in parallel using a column addressing circuit 1144. The pixel signals, which include a pixel reset signal Vrst and image pixel signal Vsig, are provided as outputs of the readout circuit 1142, and are typically subtracted in a differential amplifier 1160 and the result digitized by an analog to digital converter 1164 to provide a digital pixel signal. The digital pixel signals represent an image captured by pixel array 230 and are processed in an image processing circuit 1168 to provide an output image.

Figure 12:
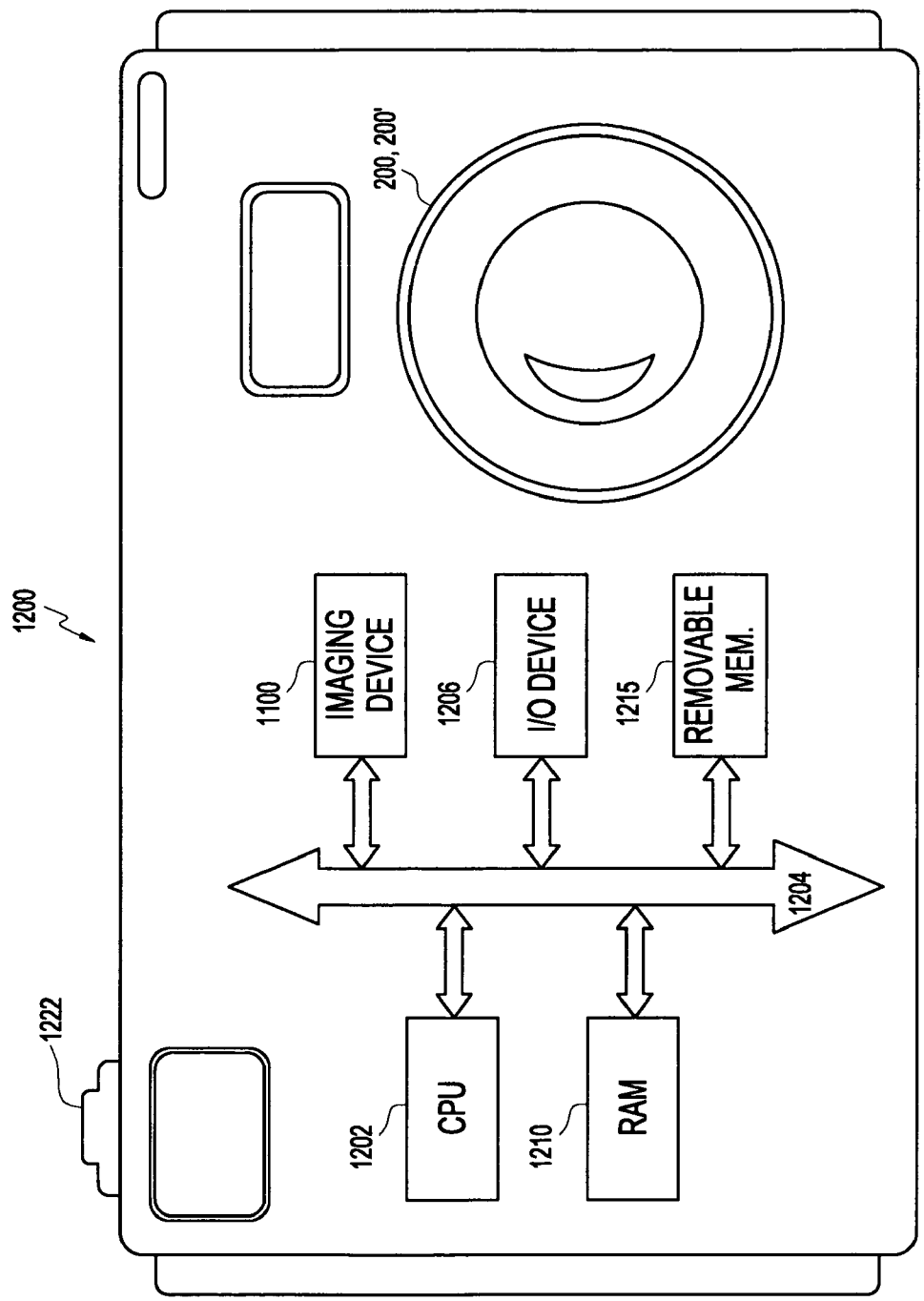
FIG. 12 depicts a system constructed in accordance with an embodiment described herein.

FIG. 12 shows a system 1200 that includes an imaging device 1100 and a lens 200 constructed and operated in accordance with the various embodiments described above. The system 1200 is a system having digital circuits that include imaging device 1100. Without being limiting, such a system could include a computer system, camera system, scanner, machine vision, vehicle navigation, video phone, surveillance system, auto focus system, star tracker system, motion detection system, image stabilization system, or other image acquisition system.

System 1200, e.g., a digital still or video camera system, generally comprises a central processing unit (CPU) 1202, such as a control circuit or microprocessor for conducting camera functions, that communicates with one or more input/output (I/O) devices 1206 over a bus 1204. Imaging device 1100 also communicates with the CPU 1202 over the bus 1204. The processor system 1200 also includes random access memory (RAM) 1210, and can include removable memory 1215, such as flash memory, which also communicates with the CPU 1202 over the bus 1204. The imaging device 1100 may be combined with the CPU processor with or without memory storage on a single integrated circuit or on a different chip than the CPU processor. In a camera system, a lens 200 according to various embodiments described herein may be used to focus image light onto the pixel array 230 of the imaging device 1100 and an image is captured when a shutter release button 1222 is pressed.

While embodiments have been described in detail in connection with the embodiments known at the time, it should be readily understood that the claimed invention is not limited to the disclosed embodiments. Rather, the embodiments can be modified to incorporate any number of variations, alterations, substitutions or equivalent arrangements not heretofore described. For example, while some embodiments are described in connection with a CMOS pixel imaging device, they can be practiced with any other type of imaging device (e.g., CCD, etc.) employing a pixel array or a camera using film instead of a pixel array.

The invention claimed is:

1. A lens structure, comprising:
    a first convex lens comprising a first curved side and a first flat side;
    a concave lens comprising a second curved side and a second flat side, the second curved side of the concave lens being arranged to face the first curved side of the first convex lens;
    a first space arranged between the first curved side of the first convex lens and the second curved side of the concave lens; and
    a Fresnel lens comprising a third flat side and a side comprising a faceted structure, the third flat side of the Fresnel lens being arranged to face the second flat side of the concave lens.

2. The lens structure of claim 1, further comprising a third substrate arranged between the concave lens and the Fresnel lens.

3. The lens structure of claim 1, wherein the first convex lens, concave lens, and Fresnel lens have substantially the same index of refraction.

4. The lens structure of claim 1, wherein the first convex lens, concave lens, and Fresnel lens comprise a polymer material.

5. The lens structure of claim 1, wherein the faceted structure of the Fresnel lens comprises a plurality of concentric facets, each of the facets having a first side and a second side.

6. The lens structure of claim 5, wherein facets located closer to a center of the faceted structure are wider than facets located farther from the center of the faceted structure.

7. The lens structure of claim 6, wherein all of the facets have the same depth.

8. The lens structure of claim 5, wherein facets located farther from a center of the faceted structure are deeper than facets located closer to the center of the faceted structure.

9. The lens structure of claim 8, wherein all of the facets have the same period.

10. The lens structure of claim 5, wherein the first side of the facets is arranged to be perpendicular to a light ray having a chief ray angle able to reach a particular facet.

11. The lens structure of claim 5, wherein the second side of the facets is arranged to be parallel to a light ray having a chief ray angle still able to reach a particular facet.

12. The lens structure of claim 5, wherein the first side of the facets comprise a convex curve.

* * * * *